United States Patent
Zenga

(10) Patent No.: US 6,794,056 B1
(45) Date of Patent: Sep. 21, 2004

(54) LAMINAR STRUCTURE

(75) Inventor: Giovanni Battista Zenga, Pino Torinese (IT)

(73) Assignee: Nord Impianti S.r.l., Rovereto (IT)

( * ) Notice: Subject to any disclaimer, the term of this patent is extended or adjusted under 35 U.S.C. 154(b) by 0 days.

(21) Appl. No.: 10/088,842

(22) PCT Filed: Sep. 22, 2000

(86) PCT No.: PCT/IB00/01419

§ 371 (c)(1),
(2), (4) Date: Jun. 13, 2002

(87) PCT Pub. No.: WO01/21282

PCT Pub. Date: Mar. 29, 2001

(30) Foreign Application Priority Data

Sep. 22, 1999 (GB) .............................. 9922451

(51) Int. Cl.$^7$ ...................... B01D 39/10; B01D 39/20; C25D 1/08
(52) U.S. Cl. ................. 428/596; 428/613; 428/935; 205/75; 210/500.25; 210/500.23
(58) Field of Search ................. 428/596, 599, 428/935, 613; 205/75; 210/500.25, 498, 499, 500.23

(56) References Cited

U.S. PATENT DOCUMENTS

| | | | | |
|---|---|---|---|---|
| 2,226,384 A | * | 12/1940 | Norris | 205/75 |
| 2,650,900 A | * | 9/1953 | Holman | 205/75 |
| 2,702,270 A | * | 2/1955 | Donahue et al. | 205/75 |
| 4,039,397 A | * | 8/1977 | Klemm | 205/75 |
| 4,039,830 A | * | 8/1977 | Yang | 378/31 |
| 4,118,288 A | | 10/1978 | Rückl | 204/11 |
| 4,552,832 A | | 11/1985 | Blume et al. | 430/320 |
| 4,636,219 A | * | 1/1987 | Pratt et al. | 623/23.3 |
| 4,772,540 A | * | 9/1988 | Deutsch et al. | 430/320 |
| 4,797,211 A | | 1/1989 | Ehrfeld et al. | 210/321.84 |
| 4,839,001 A | | 6/1989 | Bakewell | 204/11 |
| 5,147,852 A | * | 9/1992 | Cowan et al. | 507/104 |
| 5,190,653 A | * | 3/1993 | Herrick et al. | 210/477 |
| 6,018,459 A | * | 1/2000 | Carlson et al. | 361/704 |

FOREIGN PATENT DOCUMENTS

| | | | | |
|---|---|---|---|---|
| EP | 0038902 | * | 11/1981 | |
| EP | 0230006 | * | 7/1987 | |
| EP | 0 385 961 A1 | | 9/1990 | C25D/1/08 |
| EP | 0 621 018 A | | 10/1994 | |
| GB | 0 579 571 A | | 8/1946 | |
| GB | 1 215 864 A | | 12/1970 | |
| GB | 2063299 | * | 6/1981 | |
| GB | 1 602 981 A | | 11/1981 | C25D/5/56 |
| GB | 2 108 154 A | | 5/1983 | C25D/3/56 |
| JP | 55-097220 | * | 7/1980 | |
| JP | 55-097220 A | | 7/1980 | |
| JP | 61-189943 | * | 8/1986 | |
| JP | 10-068729 | * | 3/1998 | |
| SU | 1 784 435 A | | 12/1992 | B23P/15/12 |

OTHER PUBLICATIONS

Search Report under Section 17, Patents Act 1977, issued by UK Patent Office, Dec. 13, 1999.
Patent Abstracts of Japan, vol. 4, No. 151, Oct. 23, 1980.

* cited by examiner

*Primary Examiner*—John J. Zimmerman
(74) *Attorney, Agent, or Firm*—Renner, Otto, Boisselle & Sklar, LLP

(57) ABSTRACT

A laminar structure (17) comprising a deposited metal, the structure having microholes (17a) extending between a first surface and a second surface thereof, each microhole having a wall which meets the first surface with a rounded edge or tapered configuration in such a manner that the first surface is substantially smooth.

11 Claims, 2 Drawing Sheets

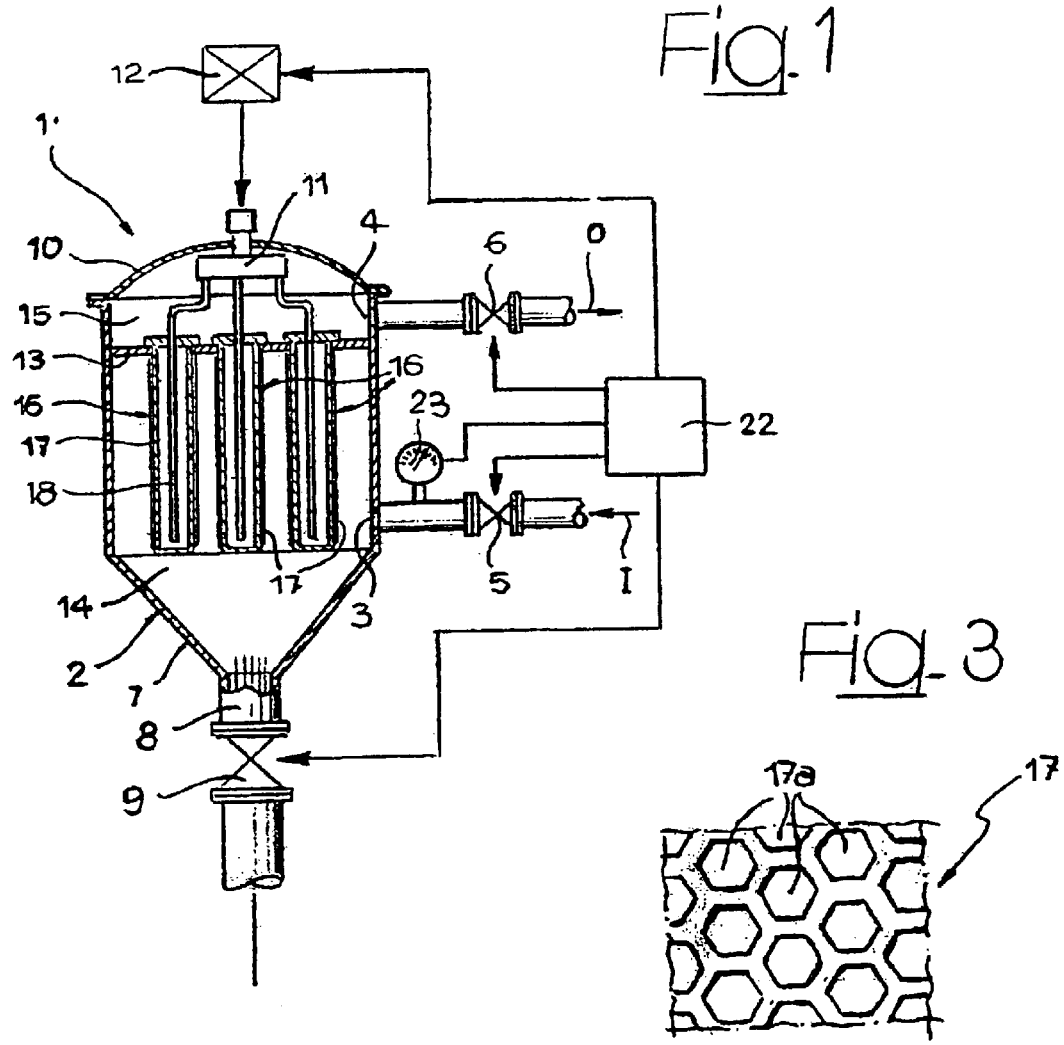
Fig. 1
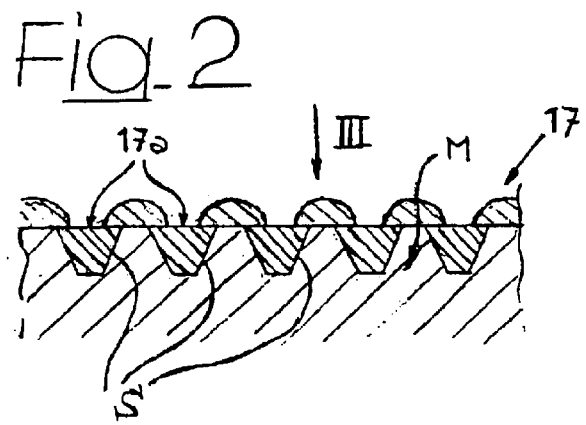
Fig. 3
Fig. 2

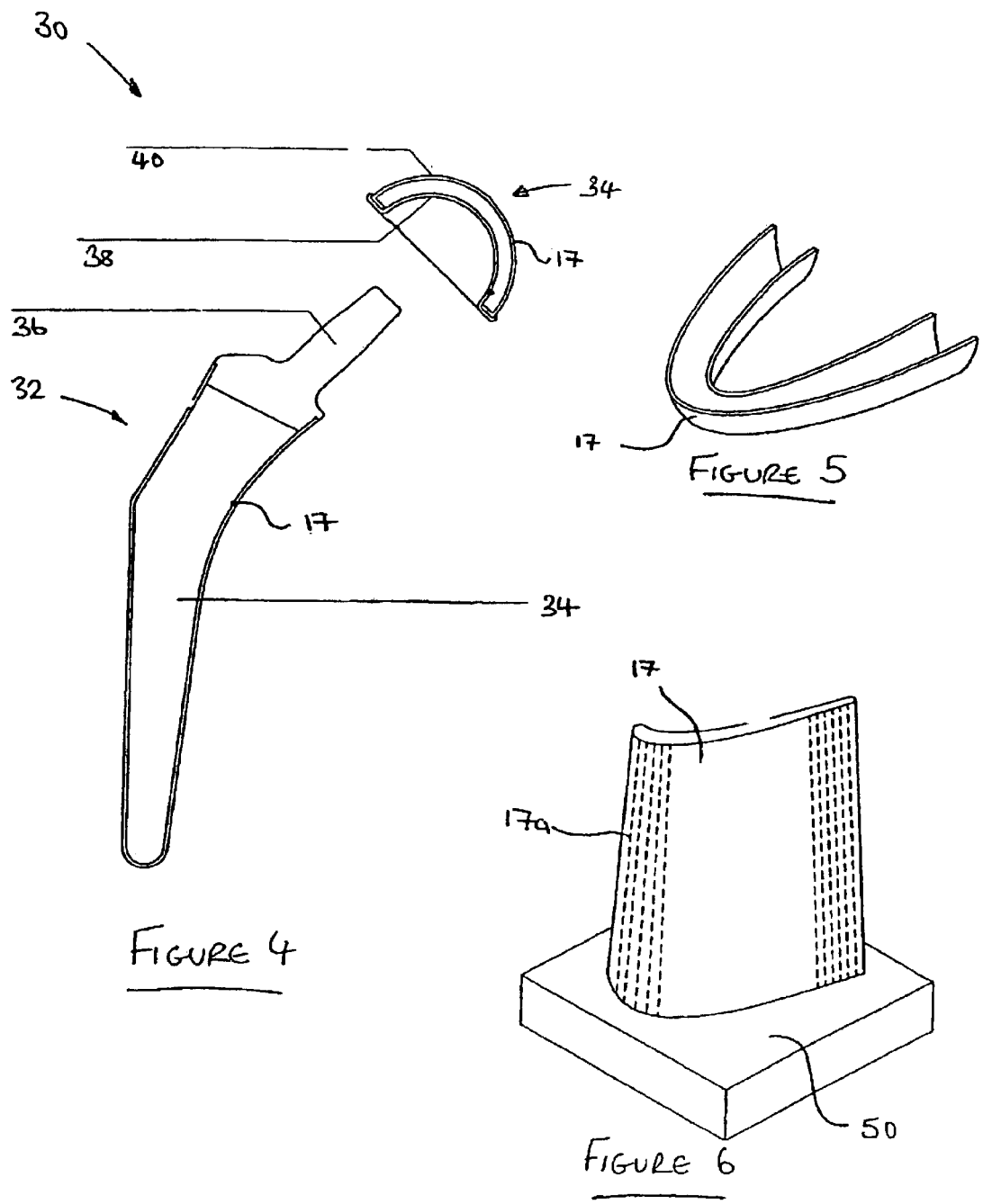

LAMINAR STRUCTURE

FIELD OF THE INVENTION

This invention relates to laminar structures. Preferred embodiments relate to laminar structures as filter elements, laminar structures as heat sinks, and laminar structures as medical devices.

SUMMARY OF THE INVENTION

As mentioned above, one embodiment of the present invention is concerned with filtering devices in general and, more particularly a filtering element for treating liquids, dusts and also gases. This aspect of the invention is useful for filtering liquids that contain material to be removed (for example lubricating and/or cooling liquids employed in mechanical processing), for filtering dusts in environments in general (especially industrial environments, such as steel works for example), and for processing exhaust gases from internal combustion engines of motor vehicles and, more particularly, oxidizing anhydrides present in these gases.

It would be desirable if the filtering element described above could be readily cleaned from time to time, should this prove necessary, thereby avoiding difficulties associated with clogging which might otherwise require the element to be replaced.

Another embodiment of the invention is concerned generally with heat sinks by means of which beat may be dissipated from machinery and the like. In such situations, it is advantageous for air, for example, to be able to flow cleanly through the heat sink with reduced disruption.

Another embodiment of the invention is concerned generally with medical devices, and in particular with orthopedic or orthodontic devices where it is preferred that the body of the patient, and in particular the bones of the patient, can bond with and secure the device in place.

In a first aspect, the invention provides a laminar structure comprising a deposited metal, the structure having microholes extending between a first surface and a second surface thereof. each microhole having a wall which meets the first surface with a rounded edge or tapered configuration in such a manner that the first surface is substantially smooth.

Other preferred features are set out in the appended claims.

In a preferred form, the laminar structure when used as a filtering element comprises a tubular and generally cylindrical body with a perforated wall intended to be crossed by a fluid to be filtered, essentially characterized in that the said wall presents a layer-like structure obtained by means of a controlled galvanic electroforming process with selective deposition of nickel on a matrix arranged at the cathode, the said layer-like structure having an outer surface which is smooth and devoid of roughness and being formed with micro-holes that have walls with rounded edges and diameters depending on the length of time in the galvanic bath and the desired-thickness of the laminar structure, preferably smaller than 30 micron.

When used for the filtering of liquids, the filtering element in accordance with the invention can be advantageously applied, possibly together with several other similar filtering elements, to constitute a self-cleansing filtering device.

Aspects of the invention will now be described by way of example only and with reference to the accompanying drawings, in which:

DRAWINGS

FIG. 1 is a schematic view of a filtration system which incorporates a laminar structure as a filter element;

FIG. 2 is a schematic view of a portion of the laminar structure during its production process;

FIG. 3 is a schematic plan view in the direction of the arrow III of FIG. 2.

FIG. 4 is a schematic view of the laminar structure as a medical device; and

FIG. 5 is a schematic view of the laminar structure as another type of medical device; and FIG. 6 is a schematic view of the laminar structure as a heat sink.

DETAILED DESCRIPTION

FIG. 1 shows a filtering device 1 interposed between an inlet line I of a liquid to be filtered (for example, a cooling emulsion of oil and water used during the carrying out of a machine to be removed which may contain shavings and other particles of material to be removed) an outlet line O that the liquid, when filtered and cleansed of at least some particles it contained, crosses in order to be re-inserted in the cooling circuit.

The filtering device 1 comprises a closed shell 2 (which is normally metallic) that is provided with an inlet opening 3 in communication with the inlet line I and an outlet opening 4 in communication with the outlet line O.

The inlet opening 3 and the outlet opening 4 are associated with, respectively, the valves (which may be electrically operated valves for example) indicated schematically by the reference numbers 5 and 6, which make it possible for the openings 3 and 4 to be selectively opened and closed.

The shell 2, which is preferably of a circular cross-section, has a lower portion 7 in the form of a funnel that converges onto a lower discharge opening 8 that is likewise controlled by a valve 9 (which may also be an electric valve).

The upper part of the shell 2 is closed by a selectively removable lid 10 on which there is mounted a pneumatic distribution device 11 that can be supplied with pressurized air or other fluid gas from a source 12.

Reference number 13 indicates a flange that extends transversely inside the shell 2 and in contact with its upper extremity. The flange 13 divides the volume within the shell 2 into a first chamber 14 which corresponds roughly to the middle and lower portion of the shell 2, and a second chamber 15 that corresponds roughly to the upper portion of the shell 2.

The first chamber 14 communicates with the inlet opening 3, while the second chamber 15 communicates with the outlet opening 4.

The flange 13 which acts as a partition baffle within the shell 2 carries a plurality of filtering members 16, each of which comprises an elongate support in the form of a hollow, and therefore permeable, cylinder, one end, preferably the upper end, of which is connected in a watertight manner to the flange 13. The other, preferably the lower end, is closed and arranged as to be generally coincident with the lower funnel portion 7 of the shell. Within the first chamber 15 each of the filtering members 16 therefore extends downwards from the flange 13. The internal cavity of each of the said filtering members 16 communicates with the second chamber 15.

It will be understood, of course, that the positional phrases "upper", "lower" and "downwards" relate solely to the orientation shown in FIG. 1 and therefore should not be taken as implying any other positional or orientational limitation.

Each of the filtering members 16 is surrounded by an external filtering element 17 (the laminar structure) that consists of a thin and flexible cylindrical sheath, which may also be slightly conical, and which is open at both ends (although it could be open at just one end).

As can be seen more readily in FIGS. 2 and 3, each filtering element 17 has a micro-perforated laminar or layer-like structure and is therefore porous, where the perforations, indicated by 17a, have a plan (or section) form (i.e. have a shape when in plan view) that may be polygonal, generally hexagonal, or rhomboidal and walls that have rounded surfaces and taper from the outer face of the layer towards the inner face. More generally, the micro-holes 17a may have a form that simply converges or simply diverges from the outer face to the inner face of the layer and may also be of a converging-diverging form. The said microholes 17a may have diameters depending on the length of time in the galvanic bath and the desired thickness of the structure. One has to do with dimensions that will normally be less than 60 microns, preferably less than 30 microns, and could be, for example, of the order of 3–4 microns. These diameter sizes may either be homogeneous or differ from one region to another, in accordance with appropriate optimization criteria.

It is, of course, possible to use filtering elements 17 in which the hole sizes have to be adapted to specific application requirements and are therefore different from the ones indicated hereinabove.

In general, the density of the micro-holes 17a may be comprised, for example, between 10 dots/mm and 2 dots/mm (i.e. 10 holes/mm and 2 holes/mm), while the thickness of the laminar structure may be of the order of 80 microns to 500 microns. The micro-perforated filtration lamina 17 is realized by means of a controlled galvanic electroforming process, with (in this embodiment )selective deposition of nickel on a matrix at the cathode, appropriately prepared for surface conditioning of the layer 17. In particular, the said matrix, generically indicated by the letter M, has a hollow imprint, sometimes referred to as an "inkpot", suitable for creating the conductive zones for the electroforming process and the zones rendered insulating by filling with dielectric resins that constitute the electroformed holes, and eventually leveled and chrome-plated. In this way the nickel formed on the matrix M during the electrogalvanization process becomes deposited in the surroundings of the imprints S, thus forming the micro-holes 17a. The surface of the layer 17 realized in this manner has its outer surface, i.e. the surface that during the formation process is turned towards the matrix perfectly smooth and devoid of all roughness.

Purely by way of example, in this embodiment the material employed for the depositing the nickel on the matrix at the cathode could have the following composition:

nickel sulphate 300 g/l
nickel chloride 28 g/l
boric acid 50 g/l
MAGNUM/RT (BL 251) additive 1 ml/l
1.3.6 naphthalenetrisulphonic acid trisodic salt 7 g/l The operating conditions for the galvanization process, again purely by way of example, could be as follows:

temperature: 52–56° C.
electrometric pH: 4.4–4.8
cathode movement: obligatorily rotational
cathode rotation speed: 80–90 m/min
filtration: continuous, on activated carbon As far as the number of the filtering members 16 and related filtering elements 17 in accordance with this embodiment of the invention is concerned, the choice will be made on the basis of the specific requirements of each particular application, since it is also possible, if appropriate, to use no more than a single filtering member 16.

Each filtering member 16 contains in a generally axial position a pneumatic duct 18 which is connected to a air distributor 11 and is provided with a series of air-blowing orifices arranged at different levels, each orifice being equipped with an appropriate valve not shown on the drawings. The Reference number 22 identifies an electronic unit that controls the functioning of the valves 5, 6 and 9, of the pressurised-air source 12 and a distributor 11 in such a manner as to produce an orderly sequence of filtering phases and cleaning phases of the device 1. In the embodiment here illustrated, switching between the two phases is controlled by the unit 22 as a function of the signal generated by a barometric sensor 23 that senses the fluid pressure gradient existing between the inlet opening 3 and the outlet opening 4, that is to say, the so-called loss of head of the fluid circuit through the filtering device 1.

During the filtering phase, the valve 9 is closed and the pressurized-air source 12 is deactivated. The valves 5 and 6, on the other hand, are maintained in their open positions, so that the fluid to be filtered can penetrate into the interior of first chamber 14 and subsequently pass into the second chamber 15 by passing through the micro-holes 17a of the elements 17 of the filtering members 16. As a result of the previously described dimensions of these holes, at least a proportion of any solid material (for example shavings, dirt or slag in general) dragged along by the liquid will be held back on the outer surface of the filtering elements 17, while the filtered fluid will accumulate inside the chamber 15 and eventually leave the filtering device though the outlet opening 4 (it could of course be pumped from the outlet 4 to improve flow through the device). The outer surfaces of the filtering elements 17 thus act in the truest sense of the term as "accumulation surfaces" or as surfaces upon which material upon which removed from the fluid subjected to the filtering process is accumulated.

As will be appreciated, due to the gradual accumulation of material, the clear size of the holes 17a (i.e. the portion of the holes that is not obstructed by filtered material) of the filtering elements 17 tends to diminish, thus increasing the pressure gradient between the inlet opening 3 and the outlet opening 4. When this gradient attains some predetermined or user-selected value, the barometric sensor 23 sends a switching signal to the unit 22, which thereupon commands the commencement of the cleansing phase.

During this phase the valves 5 and 6 are closed to prevent liquid from passing through the filtering device 1.

The valve 9, on the other hand, is opened and the system 11, 12, 18 is activated. An air stream (or other gaseous or fluid stream) issuing from the orifices of the air ducts 18 impinges violently on the wall of the filtering members 16 and then of the filtering elements 17, thus detaching the material deposited on the outer surfaces of the latter; this material then drops into the first chamber 14 and eventually exits from the filtering device 1 through the discharge duct 8.

On completion of the cleansing operation (which is continued for a predetermined or user-selected interval of time) the unit 22 emits commands that causes the system to pass once again into the previously described filtering phase.

It should however be noted that whilst the invention has here been described with specific reference to a filtering device for lubricating and cooling liquids employed in machining operations, it can be applied in an equally advantageous manner to a wide range of fluids, liquids and gases containing contaminating particles that have to be removed or, more generally, are to be treated. These fluids may include liquids of various kinds, air carrying atmospheric dust, and also the exhaust gases of internal combustion engines. In the latter case, however, the purification treatment of the gases does not solely consist of a filtration, but also of an oxidation of anhydrides present in the exhaust gases following the raising of their temperature during the passage through the micro-holes of the filtering element 17.

Of course, the filtering or—more generally—the treatment device that makes use of the filtering elements in accordance with the invention will have to be adapted to the particular requirements of these different applications (for example by adjusting the hole size or density), though in a generally conventional manner well within the capacity of a technician specialized in this area. It should also be noted that the cleansing system of the filtering device may likewise be different from the one here described and may be, for example, an ultrasonic system or, in the case of dusts, a simple shaking device. In the case of applications for the treatment of the exhaust gases of internal combustion engines, there is no need for a cleansing cycle, because the particulate matter retained by the filtering element in accordance with the invention will simply be released into the atmosphere for a spark ignition cycle and self-burnt in the case of a Diesel cycle.

As mentioned above, in the first embodiment of the invention the laminar structure is useful as a filter element. In a second embodiment of the invention, as will now be described with reference to FIGS. 4 and 5, the laminar structure of the invention may also be useful in medical devices. In these embodiments, it is preferred that the laminar structure comprises titanium.

FIG. 4 is a schematic view of a prosthetic hip joint which is commonly used for replacement of hip joints that have degraded, for example as a result of osteoporosis.

The joint 30 comprises a leg portion 32 and a hip portion 34. The leg portion 32 comprises a spike 34 which is designed to be driven into the femur of a patient, and a peg 36 which is receivable in the hip portion and which is designed to act as a pivot point about which the patient's leg can move.

As shown, the spike 34 is formed at least partly of the laminar structure used in the first embodiment and may have similar features to those described above. The peg 36 (in contrast to the spike) is not formed of a laminar structure as hereinbefore described, but is instead solid and of a metal or alloy so that the peg generally has a greater mechanical strength than the spike.

The hip portion comprises a dish 38 which acts as a surface on which the peg can bear during movement of the spike (which naturally occurs as the leg in which the spike is inserted is moved), and is covered by a cap 40 which is formed of the above described laminar structure.

Advantageously, the holes in the laminar structure of the spike 34 and cap 40 are such that plasma, for example, can flow therethrough to allow bodily material, such as tissue or bone for example, to grow into the spike and the cap thereby securing the spike and cap in place.

Similarly, FIG. 5 shows an orthodontic device which could be implanted in a patient who has experienced a broken jaw, for example, so that tissue or bone surrounding the device can grow into the device as the broken jaw mends. As will be appreciated, the device provides support whilst the broken bone is mending, and also acts as a means for strengthening the mended bone.

In addition to being used as an orthodontic device, it will be apparent that the laminar structure could also be used to overlie a break in a patients radius or ulna, for example, or any other bone. Effectively, the laminar structure acts to support the bone whilst healing and also acts as a means for strengthening the break after healing has occurred. The laminar structure could be secured to the bones either side of a break to stabilise the break and to assist the mending of the break that naturally occurs.

FIG. 6 is an elevational view of a third embodiment of the invention, where the laminar structure 17 is used as a heat sink. In this embodiment, it is preferred that the laminar structure is of a good heat conductor such as nickel, titanium, silver, gold or brass.

As shown in FIG. 6, the laminar structure is attached to a surface 50 which will be or is warm or hot. The surface 50 could, for example, be a housing for a piece of electronic equipment such as a microprocessor, or a housing for another mechanical and/or electrical device. The laminar structure serves to conduct heat away from the surface 50, and the holes formed in the structure allow air to flow through the structure to further improve the heat dissipating effect of the structure.

It will be appreciated from the above that as the outer surface of the laminar structure is smooth and devoid of roughness and is formed with micro-holes that have walls with rounded edge, it is particularly well suited for use in medical devices since the likelihood of rough edges which could cause internal injuries is reduced. Furthermore, as the structure is substantially smooth it is easier to clean. The smooth nature of the structure is also advantageous when used as a heat sink since the smooth surface is less likely to resist air flow thereover and/or therethrough.

It will be apparent from the above, that one embodiment of the invention provides a laminated structure, manufactured to the desired form with perforated walls which can dissipate heat when machines operate at high temperatures is obtained by a galvanic electro-forming process with deposition of nickel or titanium or silver or gold or brass on a matrix (M) arranged at the cathode. It is designed superficially with micro-incisions until the desired micro-perforations are position where desired, at the diameter desired and at the thickness requested for a correctly calculated wall thickness.

Another embodiment of the invention provides a laminated structure, manufactured to the desired form with perforated walls which is designed to be used for the mending of bones for the medical sector in orthopedics and/or orthodontics is obtained by a galvanic electroforming process with deposition of titanium on a matrix (M) arranged at the cathode. It is designed superficially with micro-incisions until the desired micro-perforations are positioned where desired, at the diameter desired which can be linked to the diameter of plasma cells to nourish the bone material being reconstructed.

In another arrangement, the laminar structure can be formed or constructed as a cage and secured at either end to a bone or parts of the same bone. As a result of the microholes in the structure, blood can flow therethrough to enable the bones to regenerate themselves.

Naturally, the construction details and the embodiments described above may be varied with respect to what has here been described and illustrated without disserting from the spirit and the scope of the present: invention as set out in the claims that follow.

What is claimed is:

1. A tubular filter element obtained by way of a controlled galvanic electroforming process, said filter element having a flexible perforated laminar structure comprising a deposited metal, the laminar structure having microholes extending between a first surface and a second surface thereof, each microhole having a wall which meets the first surface with a rounded edge or tapered configuration in such a manner that the first surface is substantially smooth, and wherein the microholes have a diameter of less than 60 microns.

2. A filter element according to claim 1, wherein the microholes have a diameter of less than 30 µm.

3. A filter element according to claim 2, wherein the microholes have a diameter of less than 3–4 µm.

4. A filter element according to claim 1, wherein the microholes have a polygonal or rhomboid form.

5. A filter element according to claim 1, wherein the laminar structure is of nickel.

6. A filter element according to claim 1, wherein the laminar structure is arranged to facilitate cleaning of the filter element.

7. A filter element according to claim 1, wherein the thickness of the laminar structure is 80 microns to 500 microns.

8. A filter element according to claim 1, wherein the density of the microholes is between 10 holes/mm and 2 holes/mm.

9. A filtering device comprising a filter element according to claim 1.

10. A method of forming a laminar structure comprising selectively depositing in a galvanic electroforming process a metal on a matrix arranged at the electroforming cathode to form said structure with a smooth surface formed with microholes meeting the first surface with a rounded or tapered configuration, the walls of said holes having rounded edges and diameters of less than 60 microns which are formed in dependence upon the length of time the structure is placed in a galvanic bath used in said process and the desired thickness of the laminar structure.

11. A method according to claim 10, wherein the metal is nickel, gold, silver, brass or titanium.

* * * * *